US011146507B1

(12) United States Patent
Filsfils et al.

(10) Patent No.: US 11,146,507 B1
(45) Date of Patent: Oct. 12, 2021

(54) SYSTEMS AND METHODS FOR SRV6 MICRO SEGMENT INSERTION

(71) Applicant: Cisco Technology Inc., San Jose, CA (US)

(72) Inventors: Clarence Filsfils, Brussels (BE); Pablo Camarillo Garvia, Madrid (ES); Syed Kamran Raza, Kanata (CA); Francois Clad, Strasbourg (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/847,173

(22) Filed: Apr. 13, 2020

(51) Int. Cl.
*H04L 12/935* (2013.01)
*H04L 29/06* (2006.01)
*H04L 12/721* (2013.01)
*H04L 29/12* (2006.01)

(52) U.S. Cl.
CPC .......... *H04L 49/3009* (2013.01); *H04L 45/34* (2013.01); *H04L 69/22* (2013.01); *H04L 61/6059* (2013.01)

(58) Field of Classification Search
None
See application file for complete search history.

(56) References Cited

U.S. PATENT DOCUMENTS

| | | | |
|---|---|---|---|
| 10,367,734 B2 | 7/2019 | Bashandy et al. | |
| 10,469,370 B2 | 11/2019 | Filsfils et al. | |
| 10,506,083 B2 | 12/2019 | Filsfils et al. | |
| 10,516,610 B2 | 12/2019 | Filsfils et al. | |
| 10,652,133 B1* | 5/2020 | Morris | H04L 45/24 |
| 2019/0190818 A1* | 6/2019 | Ceccarelli | H04L 45/56 |
| 2020/0195556 A1* | 6/2020 | Tang | H04L 45/566 |
| 2020/0358698 A1* | 11/2020 | Song | H04L 69/22 |

OTHER PUBLICATIONS

SPRING, Internet-Draft, Network Programming Extension. https://tools.ietf.org/html/draft-filsfils-spring-net-pgm-extension-srv6-usid-02, dated Aug. 2019.

* cited by examiner

*Primary Examiner* — Diane L Lo
(74) *Attorney, Agent, or Firm* — Baker Botts, LLP

(57) ABSTRACT

The present disclosure relates to methods and systems for inserting micro segments into a data packet. The methods may include the steps of receiving a packet with a destination address corresponding to a Micro Segment Identifier (uSID) carrier having one or more existing micro segments followed by one or more empty micro segment positions, receiving information relating to one or more new micro segments to be inserted into the uSID carrier, the one or more new micro segments associated with a new bit length, calculating a remaining bit length of the uSID carrier, the remaining bit length associated with the one or more empty micro segment positions in the uSID carrier, wherein, if the remaining bit length is greater than or equal to the new bit length, updating the uSID carrier by inserting the new micro segments, and forwarding the packet to destinations associated with the updated uSID carrier.

20 Claims, 5 Drawing Sheets

SYSTEMS AND METHODS FOR SRV6 MICRO SEGMENT INSERTION

TECHNICAL FIELD

This disclosure generally relates to the field of data communications, and more particularly, to methods and systems for inserting micro segments into a data packet.

BACKGROUND

The communications industry is rapidly changing to adjust to emerging technologies and ever-increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based one or more values representing network nodes or paths.

DESCRIPTION OF EXAMPLE EMBODIMENTS

Overview

Figure 1A:
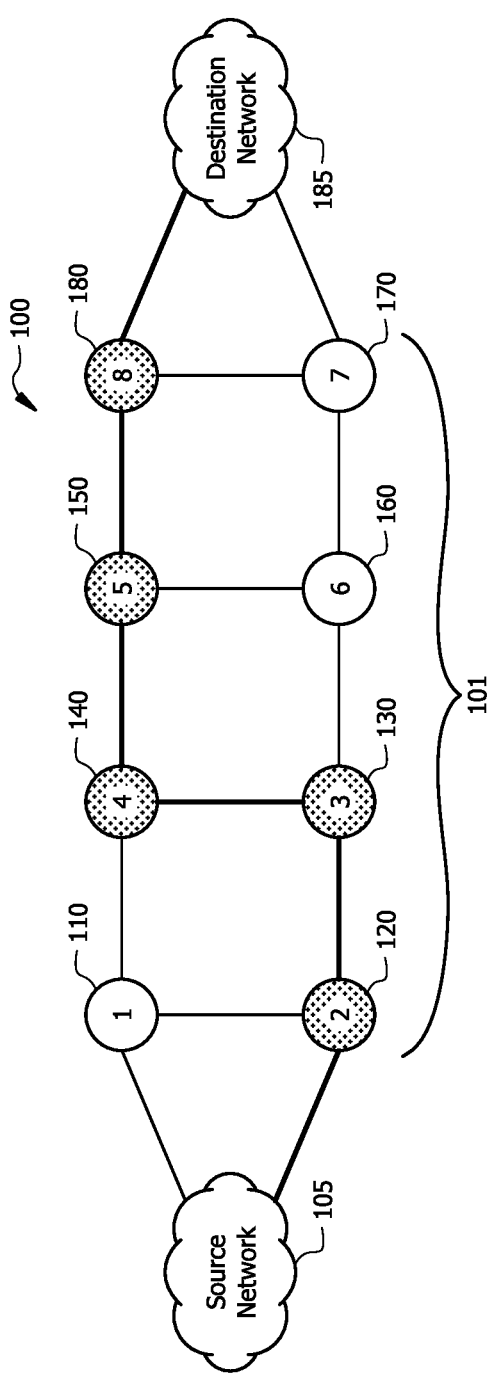
FIG. 1A illustrates an example system of packet forwarding based on segment routing in a network, according to the present disclosure.

According to an embodiment, an apparatus includes one or more processors and one or more computer-readable non-transitory storage media coupled to the one or more processors. The one or more computer-readable non-transitory storage media include instructions that, when executed by the one or more processors, cause one or more components to perform operations including, receiving a packet with a destination address corresponding to a uSID carrier having one or more existing micro segments followed by one or more empty micro segment positions, receiving information relating to one or more new micro segments to be inserted into the uSID carrier, the one or more new micro segments associated with a new bit length, calculating a remaining bit length of the uSID carrier, the remaining bit length associated with the one or more empty micro segment positions in the uSID carrier, wherein, if the remaining bit length is greater than or equal to the new bit length, updating the uSID carrier by inserting the one or more new micro segments into the uSID carrier, and forwarding the packet to one or more destinations associated with the updated uSID carrier.

The packet may be an Internet Protocol version 6 (IPv6) packet. The uSID carrier may include a uSID block which precedes the one or more existing micro segments, the uSID block indicating that the destination address of the packet corresponds to the uSID carrier.

The operation of calculating may further include determining a total bit length of the uSID carrier, determining a last bit value associated with a last micro segment of the one or more existing micro segments, and calculating a difference between the total bit length and the last bit value, the difference indicating the remaining bit length of the uSID carrier.

The operation of updating may further include shifting right the one or more existing micro segments by a number of bits corresponding to the new bit length of the one or more new micro segments, thereby creating intermediate empty micro segment positions in the uSID carrier.

The operation of updating may further include inserting the one or more new micro segments into the intermediate empty micro segment positions in the uSID carrier.

The operations may also include determining a forwarding rule based on a next destination address in the updated uSID carrier, and forwarding the packet based on the forwarding rule.

According to another embodiment, a method may include receiving a packet with a destination address corresponding to a uSID carrier having one or more existing micro segments followed by one or more empty micro segment positions, receiving information relating to one or more new micro segments to be inserted into the uSID carrier, the one or more new micro segments associated with a new bit length, calculating a remaining bit length of the uSID carrier, the remaining bit length associated with the one or more empty micro segment positions in the uSID carrier, wherein, if the remaining bit length is greater than or equal to the new bit length, updating the uSID carrier by inserting the one or more new micro segments into the uSID carrier, and forwarding the packet to one or more destinations associated with the updated uSID carrier.

According to yet another embodiment, one or more computer-readable non-transitory storage media embody instructions that, when executed by a processor, cause one or more components to perform operations including receiving a packet with a destination address corresponding to a uSID carrier having one or more existing micro segments followed by one or more empty micro segment positions, receiving information relating to one or more new micro segments to be inserted into the uSID carrier, the one or more new micro segments associated with a new bit length, calculating a remaining bit length of the uSID carrier, the remaining bit length associated with the one or more empty micro segment positions in the uSID carrier, wherein, if the remaining bit length is greater than or equal to the new bit length, updating the uSID carrier by inserting the one or more new micro segments into the uSID carrier, and forwarding the packet to one or more destinations associated with the updated uSID carrier.

Technical advantages of certain embodiments of this disclosure may include one or more of the following. Certain embodiments of this disclosure may allow for leveraging of SRv6 architecture to encode within a single IPv6 address or a single uSID carrier several micro segment instructions. This may enable use cases where an intermediate packet router in a network may need to insert micro segments into a packet that already contains a uSID carrier, and may be helpful on platforms having limited application-specific integrated circuit (ASIC) capabilities.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Packet switching is a method of transferring data in a network. In order to transfer the file in an efficient manner and minimize the transmission latency, the data may divided into small pieces of variable length, each piece called a packet. Segment Routing is a recent technological advancement that transforms the way packets are handled in networking infrastructures. Segment Routing over an IPv6 data plane (commonly referred to as "SRv6") uses a Segment Routing Header (SRH) embedded in a IPv6 packet to describe the desired path of the packet through a network. Micro segment identifiers (referred to throughout this disclosure as "micro segments" or "uSIDs") are the latest building block of SRv6 architecture.

In general, micro segments leverage the SRv6 architecture by encoding within a single IPv6 destination address several instructions, thereby allowing for massive scaling while lowering the maximum transmission unit (MTU) overhead in a hardware friendly environment. The SRv6 segment of the IPv6 destination address where one or more micro-instructions may be encoded may be referred to as a "uSID carrier."

Figure 1B:
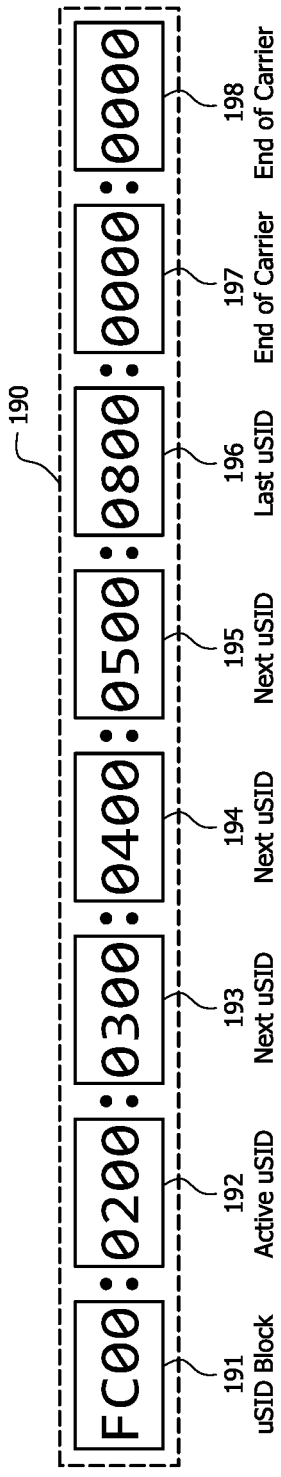
FIG. 1B illustrates an example Micro Segment Identifier (uSID) carrier, according to the present disclosure.

Reference is now made to FIG. 1A in conjunction with FIG. 1B, wherein are shown a packet forwarding system 100 based on segment routing using an example uSID carrier 190, according the present disclosure. System 100 may include a source network 105 from which a packet is sent, and a destination network 185 to which a packet is delivered. The packet may be transmitted from the source network 105 to the destination network 185 through an infrastructure network 101 comprising one or more nodes. Node 1 110, Node 2 120, Node 3 130, Node 4 140, Node 5 150, Node 6 160, Node 7 170, and Node 8 180 are shown in FIG. 1A.

By way of example, the source network 105 may desire to send a packet to a destination network 185 through a pre-determined forwarding path in the infrastructure network 101. The pre-determined forwarding path may include the traversal of specific nodes in the following order (indicated by shading in FIG. 1A): Node 2 120, Node 3 130, Node 4 140, Node 5 150, and Node 8 180. As known by those of skill in the art, an ingress provider edge (PE) (a border router of the provider domain) may construct uSID carrier 190, as shown in FIG. 1B, to route the packet through the designated nodes 120, 130, 140, 150, 180 to the destination network 185.

The uSID carrier 190 may comprise a 128-bit header that serves as the destination address for the packet. The first section or block of the uSID carrier 190 comprises a uSID block 191, which serves as an identification block that indicates that the destination address comprises a uSID carrier 190. In other words, the uSID block 191 indicates to the system that the packet includes or is associated with a uSID carrier 190. The uSID block 191 includes an IPv6 prefix. In FIG. 1B, the uSID block 191 includes the IPv6 prefix, FC00. Following the uSID block 191, the header of the uSID carrier 190 comprises a string of micro segments 192-198 (also known as uSIDs). In an embodiment, each micro segment may comprise 16 bits.

The last micro segment 198 may have a value of 0000 and may be termed an "End-of-Carrier." Likewise, any other micro segments preceding the last micro segment 198 and having a value of 0000, e.g. micro segment 197 in FIG. 1B, may also be termed as an End-of-Carrier. End-of-Carrier micro segments 197, 198 mark the end of a uSID carrier 190 and may be present more than once in a uSID carrier 190. End-of-Carrier micro segments 197, 198 also indicate empty positions in the uSID carrier 190.

Between the uSID block 191 and the End-of-Carrier blocks 197, 198 are a series of micro segments that instruct the network on the destination nodes through which the packet will traverse. The first micro segment 192 after the uSID block 191 may be termed the "active micro segment." The next micro segment 193 after the active micro segment 192 may be termed the "next micro segment." In some embodiments, there may be one or more next micro segments, e.g., micro segments 193, 194, 195 in a uSID carrier. In other embodiments, there may not be any next micro segments. The last micro segment 196 before the first End-of-Carrier 197 may be termed the "last micro segment."

The values of the active, next, and last micro segments determine the destinations of the packet. For example, in the uSID carrier 190 of FIG. 1B, the active, next, and last micro segments 192, 193, 194, 195, 196 may comprise the values <0200><0300><0400><0500><0800>, which correspond to Node 2 120, Node 3 130, Node 4 140, Node 5 150, and Node 8 180. Thus, the packet will travel through these Nodes, in the specific order in which they appear in the uSID carrier 190.

With the foregoing background, the present disclosure proposes three mechanisms for applying micro segment policies by inserting new micro segments into a packet. Each will be discussed in turn. For purposes of illustration and clarity, the three mechanisms will be discussed in conjunction with the following example packets P1, P2, and P3:

P1=(A1, B4)
P2=(A1, B4)(B5, B4, B3; SL=1)
P3=(A1, FC00:0400:0500::)

Packet 1 (P1) may comprise an IPv6 header with a source address designated by A1, and a destination address designated by B4. Packet 2 (P2) may comprise an IPv6 header with a source address A1 and a destination address B4, and may further include a Segment Routing Header (SRH) which includes segments B3, B4, and B5, each corresponding to a 128-bit address. Packet 2 (P2) has one segment left to process, as indicated by the segment left value (SL=1). Packet 3 (P3) may comprise an IPv6 header having a source address A1 and a destination address comprising a uSID carrier, having at least active and next microsegments 0400 and 0500. For purposes of this example, it may be assumed that Node 2 in the network is configured to steer traffic destined to Node 4 (B4 or FC00:0400) into an SRv6 policy that can be encoded with the following new micro segments: <0700, F7A8, 0900> of uSID block FC00.

1. First Mechanism—IPv6 Encapsulation

The first mechanism for applying the new micro segment policy (represented by micro segments <0700, F7A8, 0900> of uSID block FC00) is to encapsulate the packet. In accordance with the present disclosure, Packets P1, P2, and/or P3 having an IPv6 header may be received at Node 2 in the network. In an embodiment, the packet may alternatively have a IPv4 header. In order to steer the Packets P1, P2, and/or P3 to the SRv6 policy set forth above, a new IPv6 header may first be pushed or inserted into the Packets P1, P2, and/or P3. Then, a uSID carrier having the desired SRv6 policy (here, micro segments with destination addresses 0700, F7A8, 0900) may be inserted directly into the IPv6 header. Encapsulation according to the first mechanism may yield the following results for Packets P1, P2, and P3:

P1_out=(A2, FC00:0700:F7A8:0900::)(A1, B4)

P2_out=(A2, FC00:0700:F7A8:0900::)(A1, B4)(B5, B4, B3; SL=1)

P3_out=(A2, FC00:0700:F7A8:0900::)(A1, FC00:0400: 0500::)

As shown above, with respect to Packet 1 (P1_out), a new IPv6 header has been inserted into the packet in front of the original source and destination addresses, indicating that the new source address is (A2), and a uSID carrier having destination addresses 0700, F7A8, 0900 have been inserted into the IPv6 header after the uSID block, FC00.

2. Second Mechanism—SRH Insertion

The second mechanism for applying the new micro segment policy is insertion of a Segment Router Header (SRH). In accordance with the present disclosure, Packets P1, P2, and/or P3 having a base IPv6 header may be received at Node 2 in the network. One or more extension headers may be added to the base IPv6 header, and in an embodiment, the extension header may comprise a SRH. According to the second mechanism of the present disclosure, the first step is to modify the destination address of the existing IPv6 header into a uSID carrier and then encode the uSID carrier with the desired SRv6 policy, i.e., the set of new micro segments to be traversed by the packet. Then, the SRH (the extension header) may be encoded with the original destination addresses of the packet. As a result, the packet will first traverse the destinations represented by the micro segments, and then traverse the destination addresses in the SRH. SRH insertion according to the second mechanism may yield the following results for Packets P1, P2, and P3:

P1_out=(A2, FC00:0700:F7A8:0900::)(B4; SL=1)

P2_out=(A2, FC00:0700:F7A8:0900::)(B4, BL=1)(B5, B4, B3; SL=1)

P3_out=(A2, FC00:0700:F7A8:0900::)(FC000:0400: 0500::; SL=1)

By way of example, for IPv6 Packet 1 (P1) having an original destination address of B4, a SRH may be added to the packet. The SRH may be encoded with the original destination address B4, and the IPv6 header may be encoded with a micro segment carrier having the intermediate destination addresses to be traversed by the packet, e.g., 0700, F7A8, and 0900. These instructions will tell the packet that, before going to destination B4, the packet should go to the IPv6 destination addresses 0700, F7A8, and 0900.

3. Third Mechanism—uSID Insertion into an Existing uSID Carrier

The third mechanism to steer packets into policies represented by micro segments is based on micro segment insertion into an existing uSID carrier. For purposes of illustration, reference is now made to FIG. 2A, wherein is shown an example uSID carrier 210 according to the present disclosure. The uSID carrier 210 may correspond to a destination address of a packet, such as an IPv6 packet or an IPv4 packet, and may comprise a 128-bit SRv6 segment routing identifier consisting of a uSID block 220 and a set of micro segments 232, 234, 242, 244, 246, 248, 250. The uSID block 220 and the micro segments shown in FIG. 2 may each be 16 bits in length. Although the present disclosure describes the uSID carrier 210 as having a total bit length of 128 bits and each micro segment 232, 234, 242, 244, 246, 248, 250 as having a bit length of 16 bits, it is to be understood that the total bit length of the uSID carrier and bit length of each micro segment may correspond to any value, as understood by one of skill in the art.

Figure 2A:
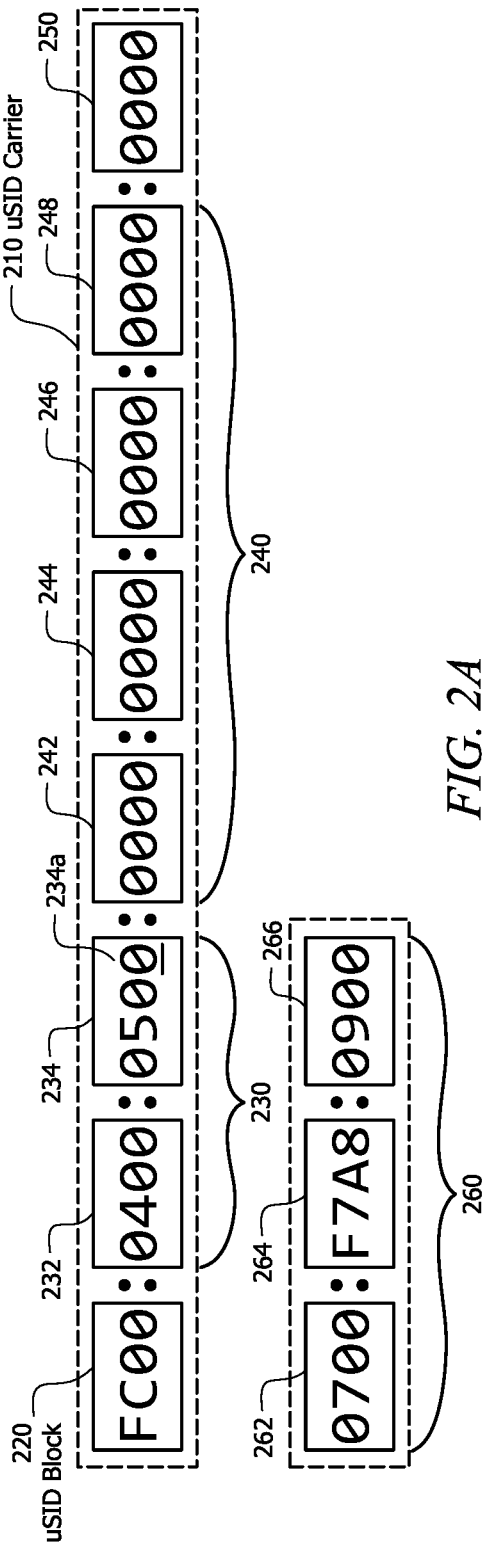
FIG. 2A illustrates an example uSID carrier having existing micro segments, according to the present disclosure.

As shown in FIG. 2A, the first block 220 may comprise a uSID block. The uSID block 220 may be located in the first position of the uSID carrier 210. The uSID block 220 may have a bit length of 16 bits, and may occupy bit positions 0 to 15. The uSID block 220 in the destination address field of an IPv6 header may serve as an identification block to indicate to the network that the destination address comprises a uSID carrier. In FIG. 2A, the uSID block 220 may consist of an IPv6 prefix corresponding to FC00. The uSID carrier 210 may further include a final End-of-Carrier micro segment 250 having a 0000 identifier, which is a globally reserved ID used to mark the end of a uSID carrier.

Next, uSID carrier 210 may include one or more existing micro segments 232, 234 (collectively labeled as element 230). Micro segment 232 may correspond to an active micro segment and micro segment 234 may correspond to a last micro segment (as it is the last micro segment before End-of-Carriers 242, 244, 246, 248 (collectively labeled as element 240). The one or more existing micro segments indicate the next destination addresses of the packet. As shown in FIG. 2, the one or more existing micro segments 232, 234 may include destinations corresponding to Node 4 (indicated by a 0400 designation) and Node 5 (indicated by a 0500 designation).

Additionally, in the example of FIG. 2, each of the one or more existing micro segments 232, 234 may have a bit length of 16 bits, and together the one or more existing micro segments 230 may occupy bit positions 16 to 47. The one or more existing micro segments 230 may further be associated with a last bit 234a having a last bit value. The last bit value is the value of the last bit 234a of the set of one or more existing micro segments 230. The calculation of the last bit value inherently takes into account the bit length of the first uSID block 220, as well as the bit lengths of the one or more existing micro segments 230. In the example of FIG. 2A, if the uSID block 220 and each of the existing micro segments 232, 234 is 16 bits in length, the last bit value is calculated by multiplying the bit length of each existing micro segment by a number corresponding to the existing micro segments (which includes the last micro segment of the one or more existing micro segments) plus 1 (to account for the uSID block 220), e.g., 16×3. Thus, for the uSID carrier 210 shown in FIG. 2A, the last bit value is 48. While the last bit value of the last bit 234a of the one or more existing micro segments 230 is 48, the bit position occupied by the last bit 234a is 47. In some embodiments, the last bit position occupied by the last bit 234a is known as the offset.

Following the one or more existing micro segments 230 and before the final End-of-Carrier 250 are one or more empty micro segment positions 242, 244, 246, 248 (collectively labeled as element 240). These correspond to micro segments having no destination address written therein, and are therefore available micro segment positions. All empty micro segments may be filled with the 0000 End-of-Carrier designation to indicate they are empty.

By way of example and to illustrate the third mechanism, an incoming packet may comprise a destination address corresponding to a uSID carrier 210. First, a determination is made that the destination address of the packet matches a known uSID block. In FIG. 2A, the uSID block is a FC00 block. The uSID carrier 210 may include a set of existing micro segments 230 and a set of empty micro segment positions 240. In accordance with a network policy, the user and/or network may receive one or more new micro segments, collectively labeled as element 260, for insertion into the uSID carrier 210 to redirect the packet through the network. In FIG. 2A, the one or more new micro segments 260 may correspond to three micro segments 262, 264, 266, each micro segment having a length of 16 bits, the three micro segments corresponding to an overall bit length of 48 bits. For purposes of clarity, the bit length of the collective one or more new micro segments 260 will be referred to as "new bit length." By way of example, the three micro segments 262, 264, 266 may correspond to destination addresses <0700>, <F7A8>, and <0900>, respectively.

In accordance with the present disclosure, in order to insert the one or more new micro segments 260 into the uSID carrier 210, a determination must be made as to whether there is enough empty space in the uSID carrier 210 to accommodate the one or more new micro segments 260. In other words, the "remaining bit length" of the uSID carrier 210, i.e., the bit length associated with the one or more empty positions of the uSID carrier 210, must be calculated.

In order to calculate the remaining bit length of the uSID carrier 210, the total bit length of the uSID carrier 210 must first be determined. As discussed above, the total bit length of uSID carrier in FIG. 2A is 128 bits (based on a calculation of 8 blocks, each block comprising 16 bits). Next, the last bit value 234a associated with the last micro segment 234 of the one or more existing micro segments 230 must be determined. As calculated above, the last bit value for the uSID carrier 210 of FIG. 2A is 48. Next, the difference between the total bit length and the last bit value may be calculated (here, 128b−48b=80b). This difference corresponds to the remaining bit length in the uSID carrier 210.

If the remaining bit length is greater than or equal to the new bit length (which, as noted above corresponds to the bit length of the one or more new micro segments 260), the uSID carrier 210 may be updated by inserting the one or more new micro segments 260 into the uSID carrier 210. In the example of FIG. 2A, the remaining bit length (80b) is greater than the new bit length (48b), indicating sufficient available space in the uSID carrier 210 for the one or more new micro segments 260. If, however, the remaining bit length is not greater than or equal to the new bit length (indicating insufficient space in the uSID carrier 210 for the one or more new micro segments 260), the packet may be directed to another headend mechanism, as determined by local policy.

Figure 2B:
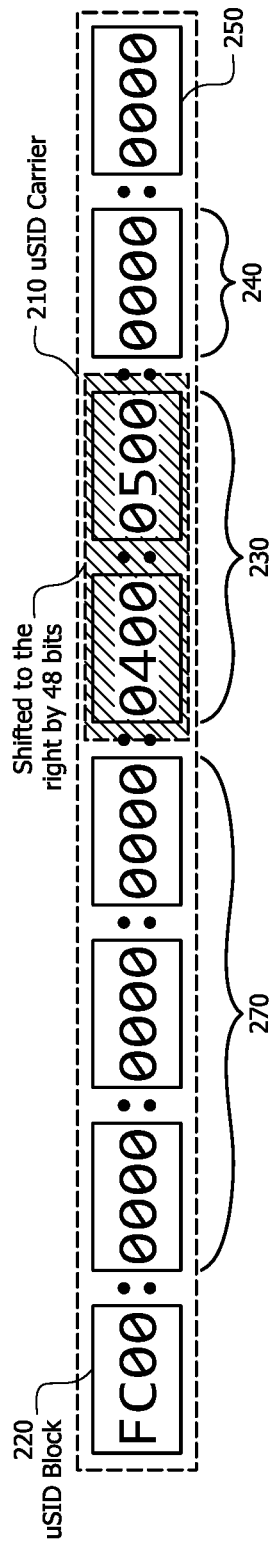
FIG. 2B illustrates an example uSID carrier after shifting bits to the right, according to the present disclosure.

Reference is now made to FIG. 2B, wherein, according to an embodiment, if the remaining bit value is greater than or equal to the new bit length, the uSID carrier 210 may be updated by shifting right the one or more existing micro segments 230 by a number of bits corresponding to the new bit length of the one or more new microsegments 260, thereby creating intermediate empty micro segment positions 270 in the uSID carrier 210. Thus, in the example of FIG. 2B, bits 16 to 47 (corresponding to the positions of the one or more existing micro segments 230) may be shifted right by 48 bits (corresponding to the new bit length of the one or more new micro segments 260). The shift right results in intermediate empty positions 270 between uSID block 220 and the shifted one or more existing micro segments 230. The bit length of the intermediate empty positions 270 corresponds to the new bit length of the one or more new micro segments 260.

Figure 2C:
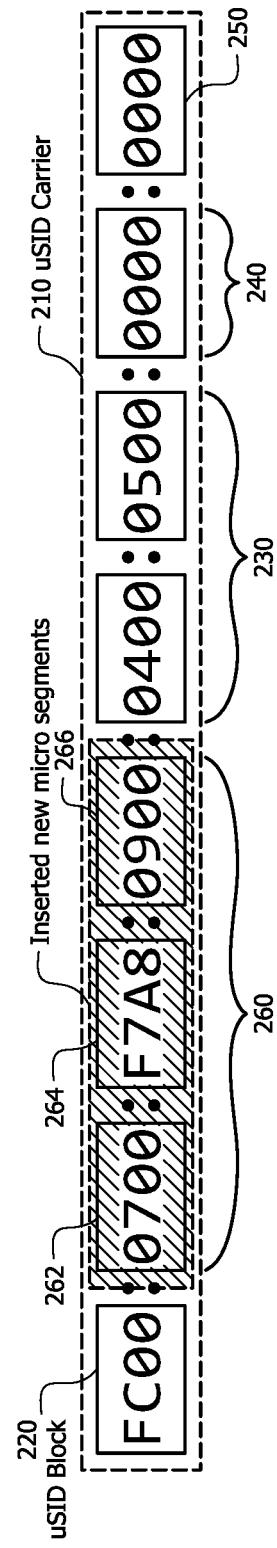
FIG. 2C illustrates an example uSID carrier with new micro segments inserted, according to the present disclosure.

With reference now to FIG. 2C, the uSID carrier 210 may be updated by inserting the one or more new micro segments 260 into the corresponding intermediate empty positions 270 in the uSID carrier 210.

In another embodiment, the uSID carrier 210 may be updated without shifting right the one or more existing micro segments 230. Instead, the one or more new micro segments may be inserted into the one or more empty micro segment positions 240 shown in FIG. 2A. In other words, once a determination is made that there is sufficient available space in the uSID carrier 210 for the one or more new micro segments 260, the one or more new micro segments 260 may be inserted into the one or more empty micro segment positions 240 of FIG. 2A, without shifting right.

Once the uSID carrier 210 is updated, the packet may be forwarded to one or more destinations associated with the updated uSID carrier 210. In an embodiment, the packet may be forwarded by first determining a forwarding rule based on the next destination address in the updated uSID carrier 210, and then forwarding the packet based on the forwarding rule. In an embodiment, the forwarding rule may be determined by looking up the updated uSID carrier by matching the information in the destination address to the forwarding information base (FIB), and then forwarding the packet along the shortest path to the destinations specified in the uSID carrier 210. In the example shown in FIG. 2C, the packet may be forwarded first to Node 7 (indicated by the 0700 designation), and then to Node F7A8 (indicated by the F7A8 designation), Node 9 (indicated by the 0900 designation), Node 4 (indicated by the 0400 designation), and Node 5 (indicated by the 0500 designation).

Figure 3:
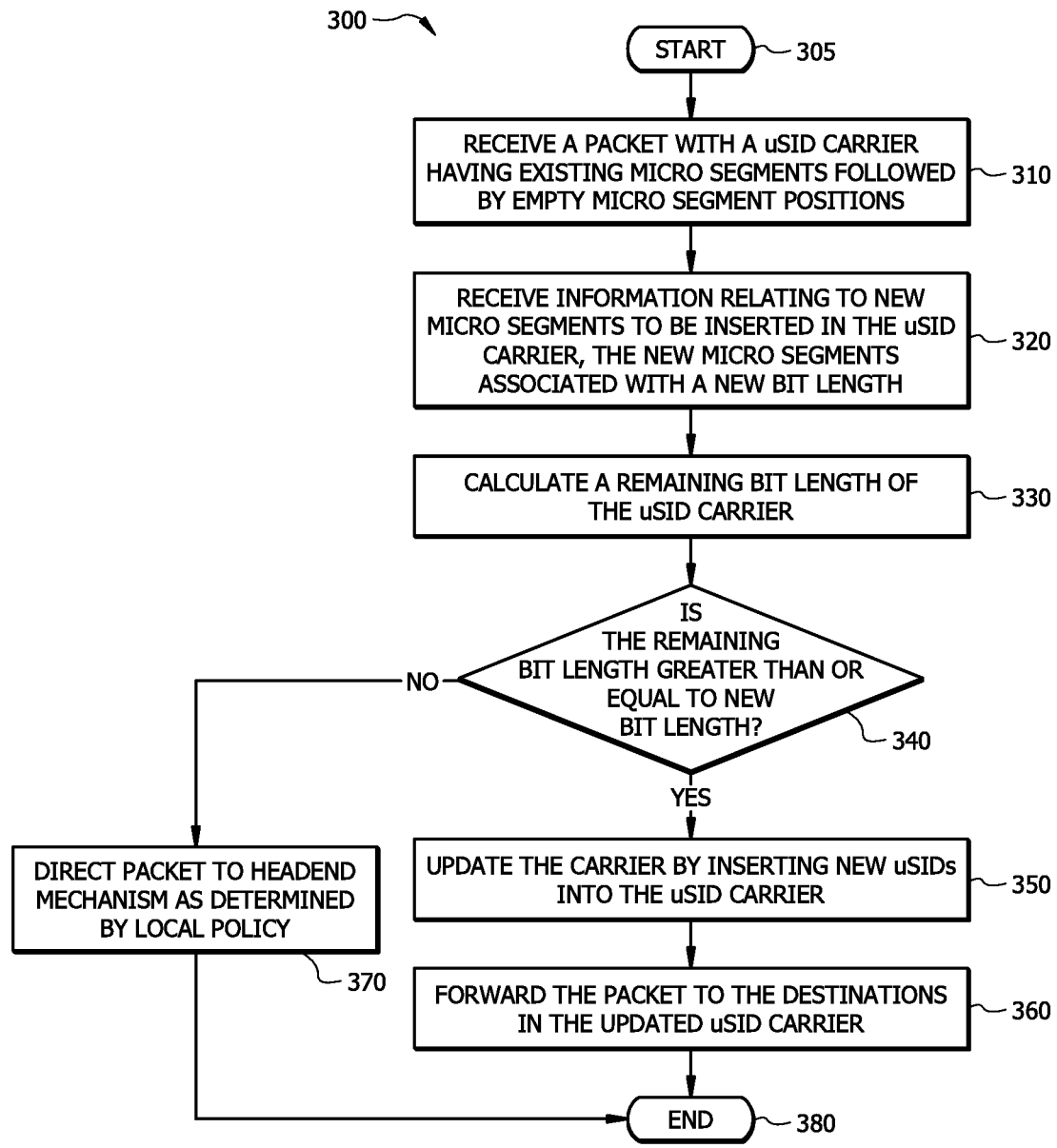
FIG. 3 illustrates a method for inserting micro segments into an existing uSID carrier.

Reference is now made to FIG. 3, wherein is shown a flow diagram of a method 300 for inserting one or more micro segments into an existing uSID carrier. First, a determination (not shown) may be made that the destination address of the packet matches a known uSID block. If the destination address of the packet matches a known uSID block, the method may begin at step 305. At step 310, a packet may be received having a destination address corresponding to a uSID carrier. The uSID carrier may include a uSID block (indicating that the destination address comprises a uSID carrier, i.e., that the packet includes or is associated with a uSID carrier). In an example, the uSID block may have a bit length of 16 bits and may occupy bit positions 0 to 15. The uSID block may be followed by one or more existing micro segments and one or more empty micro segment positions. In an example, if there are two existing micro segments, each of the existing micro segments may have a bit length of 16 bits, and together the two existing micro segments may occupy bit positions 16 to 47. The uSID carrier may also include a final micro segment, an End-of-Carrier block, occurring after the one or more empty micro segment positions and indicating the end of the uSID carrier. In an embodiment, the received packet may be an IPv6 packet, an IPv4 packet, or any other type of packet known in the art.

At step 320, information may be received relating to one or more new micro segments to be inserted into the uSID carrier. The one or more new micro segments may be associated with a "new bit length" corresponding to the bit length of the one or more new micro segments. In an example, if there are three new micro segments, each new micro segment having a length of 16 bits, the three micro segments may correspond to a new bit length of 48 bits. The one or more new micro segments may be configured to redirect the packet to one or more intermediate destinations in accordance with a Segment Routing policy.

At step 330, a "remaining bit length" of the uSID carrier may be calculated, wherein the remaining bit length may be associated with the one or more empty micro segment positions in the uSID carrier. Calculation of the remaining bit length may determine whether there is enough empty space in the uSID carrier to accommodate the one or more new micro segments.

To calculate the remaining bit length, a "total bit length" of the uSID carrier and a "last bit value" of one or more existing micro segments may be determined. First, the total bit length may correspond to the number of bits in the uSID carrier. In an example, assuming there are a total of eight blocks in the uSID carrier (one uSID block and seven micro segments or micro segment positions in the uSID carrier) and if each block or micro segment comprises a bit length of 16 bits, the total bit length of the uSID carrier may be 128 bits. It is to be understood, however, that the uSID carrier and each of the one or more micro segments need not comprise 128 bits and 16 bits, respectively, but may comprise any length of bits.

Next, a "last bit value" may be determined. The last bit value is the value of the last bit of the set of one or more existing micro segments. The calculation of the last bit value inherently takes into account the bit length of the first uSID block, as well as the bit lengths of the one or more existing micro segments. By way of example, if the uSID block and the two existing micro segments are each 16 bits in length, the last bit value is calculated by multiplying the bit length of each micro segment (i.e., 16) by the number of existing micro segments plus the uSID block (i.e., 3). Thus, the last bit value in this example is 48. Notably, the bit position occupied by the last bit of the one or more existing micro segments may be one less than the last bit value. This bit position is known as the offset. In the example, above, the offset is 47 (i.e., the last bit value, 48, minus 1).

Finally, the remaining bit length of the uSID carrier may be calculated by obtaining the difference between the total bit length and the last bit value. In the example above, the remaining bit length is 80 (i.e., 128 minus 48). The remaining bit length may correspond to the amount of empty space available in the uSID carrier.

At step 340, a determination is made as to whether the remaining bit length of the uSID carrier is greater than or equal to the new bit length of the one or more new micro segments. In the example above, the remaining bit length (80) is greater than the new bit length of the one or more new micro segments (48). If, at step 340, the remaining bit length of the uSID carrier is greater than or equal to the new bit length of the one or more new micro segments, the method may proceed to step 350, wherein the uSID carrier may be updated by inserting the one or more existing micro segments into the uSID carrier. In an embodiment, the step of updating the uSID carrier may include shifting right the one or more existing micro segments into the one or more empty micro segment positions. Specifically, the one or more existing micro segments may be shifted right by a number of bits corresponding to the new bit length of the one or more new micro segments, thereby creating intermediate empty microsegment positions in the uSID carrier. Notably, the shift right command may apply to the one or more existing micro segments following the uSID block (and does not include the uSID block itself). Then, the uSID carrier may further be updated by inserting the one or more new micro segments into the intermediate empty micro segment positions in the uSID carrier. In the example above, bits 16 to 47 (corresponding to the positions of the one or more existing micro segments) may be shifted right by 48 bits (corresponding to the new bit length of the one or more new micro segments). The shift right results in intermediate empty positions between uSID block and the one or more existing micro segments. The bit length of the intermediate empty positions (48) corresponds to the new bit length of the one or more new micro segments. The uSID carrier may be updated by inserting the 48 bits of the one or more new micro segments into the intermediate empty micro segment positions in the uSID carrier.

In another embodiment, the step of updating may not include the operation of shifting right. Instead, the one or more new micro segments may be inserted into the one or more empty micro segment positions identified in step 310.

At step 360, the packet may be forwarded to one or more destinations associated with the updated uSID carrier. In an embodiment, step 360 may further include determining a forwarding rule based on the next destination address in the updated uSID carrier and forwarding the packet based on the forwarding rule. In some embodiments, the determination of the forwarding rule may include looking up the updated uSID carrier by matching the information in the destination address to the forwarding information base (FIB), and then forwarding the packet along the shortest path to the destinations specified in the uSID carrier. The method may end at step 380.

If, at step 340, the remaining bit length of the uSID carrier is not greater than or equal to the new bit length of the one or more new micro segments (i.e., indicating that there is not enough available space in the uSID carrier), the method may proceed to step 370, wherein the packet may be directed to another headend mechanism, as determined by local policy. The method may then end at step 380.

It is to be understood that the method and systems described above may be modified without departing from the scope of the present disclosure. For example, micro segments and uSID carriers of any length may be used to achieve the results described herein. Moreover, the techniques described in the present disclosure may be applied for SR policy in binding SIDs (BSID). For example, the BSID may first be removed from the associated uSID carrier by left shifting to consume the BSID and then continuing with the method as described above. In a hardware implementation, the right shifting mechanism described above may begin at offset 32, and bits 16-31 may be rewritten.

Figure 4:
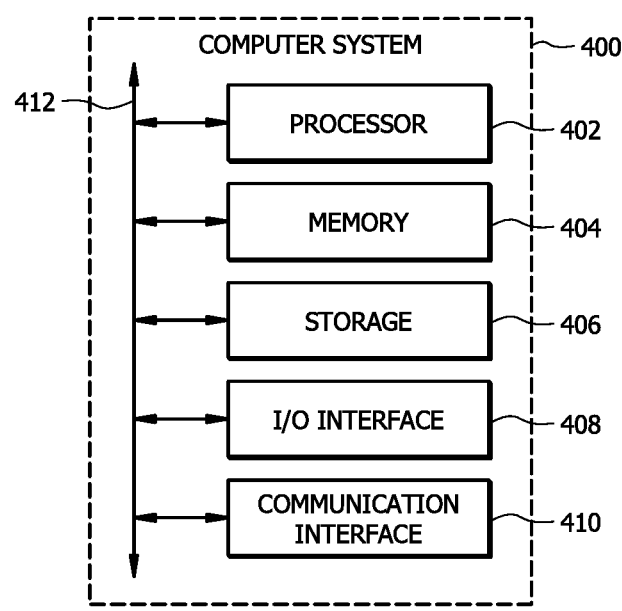
FIG. 4 illustrates a computer system that may be used by the systems and methods described herein, in accordance with the present disclosure.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), a SD-WAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media coupled to the one or more processors and comprising instructions that, when executed by the one or more processors, cause one or more components to perform operations comprising:
receiving a packet with a destination address corresponding to a Micro Segment Identifier (uSID) carrier having one or more existing micro segments followed by one or more empty micro segment positions;
receiving information relating to one or more new micro segments to be inserted into the uSID carrier, the one or more new micro segments associated with a new bit length;
calculating a remaining bit length of the uSID carrier, the remaining bit length associated with the one or more empty micro segment positions in the uSID carrier;
wherein, if the remaining bit length is greater than or equal to the new bit length, shifting right the one or more existing micro segments by a number of bits corresponding to the new bit length of the one or more new micro segments, and updating the uSID carrier by inserting the one or more new micro segments into the uSID carrier; and
forwarding the packet to one or more destinations associated with the updated uSID carrier.

2. The system of claim 1, wherein the packet comprises: an Internet Protocol version 6 (IPv6) packet.

3. The system of claim 1, wherein the operation of calculating further comprises:
determining a total bit length of the uSID carrier;
determining a last bit value associated with a last micro segment of the one or more existing micro segments; and
calculating a difference between the total bit length and the last bit value, the difference indicating the remaining bit length of the uSID carrier.

4. The system of claim 1, wherein the step of shifting right further comprises:
creating intermediate empty micro segment positions in the uSID carrier.

5. The system of claim 4, wherein the uSID carrier is updated by inserting the one or more new micro segments into the intermediate empty micro segment positions in the uSID carrier.

6. The system of claim 1, the operations further comprising:
determining a forwarding rule based on a next destination address in the updated uSID carrier, and forwarding the packet based on the forwarding rule.

7. The system of claim 1, wherein the uSID carrier comprises:
a uSID block which precedes the one or more existing micro segments, the uSID block indicating that the destination address of the packet corresponds to the uSID carrier.

8. A method, comprising:
receiving a packet with a destination address corresponding to a Micro Segment Identifier (uSID) carrier having one or more existing micro segments followed by one or more empty micro segment positions;
receiving information relating to one or more new micro segments to be inserted into the uSID carrier, the one or more new micro segments associated with a new bit length;
calculating a remaining bit length of the uSID carrier, the remaining bit length associated with the one or more empty micro segment positions in the uSID carrier;
wherein, if the remaining bit length is greater than or equal to the new bit length, shifting right the one or more existing micro segments by a number of bits corresponding to the new bit length of the one or more new micro segments, and updating the uSID carrier by inserting the one or more new micro segments into the uSID carrier; and
forwarding the packet to one or more destinations associated with the updated uSID carrier.

9. The method of claim 8, wherein the packet comprises: an Internet Protocol version 6 (IPv6) packet.

10. The method of claim 8, wherein the step of calculating further comprises:
determining a total bit length of the uSID carrier;
determining a last bit value associated with a last micro segment of the one or more existing micro segments; and
calculating a difference between the total bit length and the last bit value, the difference indicating the remaining bit length of the uSID carrier.

11. The method of claim 8, wherein the step of shifting right further comprises:
creating intermediate empty micro segment positions in the uSID carrier.

12. The method of claim 11, wherein the uSID carrier is updated by inserting the one or more new micro segments into the intermediate empty micro segment positions in the uSID carrier.

13. The method of claim 8, further comprising:
determining a forwarding rule based on a next destination address in the updated uSID carrier, and forwarding the packet based on the forwarding rule.

14. The method of claim 8, wherein the uSID carrier comprises:
a uSID block which precedes the one or more existing micro segments, the uSID block indicating that the destination address of the packet corresponds to the uSID carrier.

15. One or more computer-readable non-transitory storage media embodying instructions that, when executed by a processor, cause the processor to perform operations comprising:
receiving a packet with a destination address corresponding to a Micro Segment Identifier (uSID) carrier having one or more existing micro segments followed by one or more empty micro segment positions;
receiving information relating to one or more new micro segments to be inserted into the uSID carrier, the one or more new micro segments associated with a new bit length;
calculating a remaining bit length of the uSID carrier, the remaining bit length associated with the one or more empty micro segment positions in the uSID carrier;
wherein, if the remaining bit length is greater than or equal to the new bit length, shifting right the one or more existing micro segments by a number of bits corresponding to the new bit length of the one or more new micro segments, and updating the uSID carrier by inserting the one or more new micro segments into the uSID carrier; and forwarding the packet to one or more destinations associated with the updated uSID carrier.

16. The one or more computer-readable non-transitory storage media of claim 15, wherein the packet comprises:
an Internet Protocol version 6 (IPv6) packet.

17. The one or more computer-readable non-transitory storage media of claim 15, the operation of calculating further comprising:
determining a total bit length of the uSID carrier;
determining a last bit value associated with a last micro segment of the one or more existing micro segments; and
calculating a difference between the total bit length and the last bit value, the difference indicating the remaining bit length of the uSID carrier.

18. The one or more computer-readable non-transitory storage media of claim 15, the operation of shifting right further comprising:
creating intermediate empty micro segment positions in the uSID carrier.

19. The one or more computer-readable non-transitory storage media of claim 18, wherein the uSID carrier is updated by inserting the one or more new micro segments into the intermediate empty micro segment positions in the uSID carrier.

20. The one or more computer-readable non-transitory storage media of claim 15, the operations further comprising:
determining a forwarding rule based on a next destination address in the updated uSID carrier, and forwarding the packet based on the forwarding rule.

* * * * *